US012725104B2

(12) United States Patent
Karri et al.

(10) Patent No.: US 12,725,104 B2
(45) Date of Patent: Sep. 1, 2026

(54) USING AN AUGMENTED REALITY DEVICE TO IMPLEMENT A COMPUTER DRIVEN ACTION BETWEEN MULTIPLE DEVICES

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 17/303,716

(22) Filed: Jun. 6, 2021

(65) Prior Publication Data

US 2022/0391790 A1 Dec. 8, 2022

(51) Int. Cl.
*G06Q 10/0633* (2023.01)
*G06F 3/01* (2006.01)

(52) U.S. Cl.
CPC ......... *G06Q 10/0633* (2013.01); *G06F 3/011* (2013.01)

(58) Field of Classification Search
USPC .......................................................... 705/7.27
See application file for complete search history.

(56) References Cited

U.S. PATENT DOCUMENTS

2014/0095203 A1* 4/2014 Anand .................. G16H 40/20 705/3
2014/0160049 A1 6/2014 Shin
2016/0112479 A1* 4/2016 Jayaraj ................ H04L 65/4015 345/633
2016/0292925 A1* 10/2016 Montgomerie ....... G06F 3/1462
2017/0142324 A1* 5/2017 Jost ...................... G06Q 10/103
2018/0005442 A1* 1/2018 Mullins .................. G06Q 10/10
2018/0012122 A1* 1/2018 Williams ........... G06Q 10/0633
2018/0335998 A1 11/2018 Callaghan (Continued)

FOREIGN PATENT DOCUMENTS

WO 2022258381 A1 12/2022

OTHER PUBLICATIONS

Sereno, Mickael, et al. "Collaborative work in augmented reality: A survey." IEEE transactions on visualization and computer graphics 28.6 (2020): 2530-2549. (Year: 2020).*

(Continued)

*Primary Examiner* — Kristin E Gavin
(74) *Attorney, Agent, or Firm* — Michael A. Petrocelli

(57) ABSTRACT

A computer command can be initiated, using an augmented reality (AR) device, for implementing an action between multiple devices. A first computer command can be executed, using an augmented reality device, with respect to a source device, and the first computer command can include copying a first workflow of the source device. A second computer command can be initiated, using the augmented reality device, to a target device. The second computer command can include sending the first workflow of the source device to the target device. A comparative analysis of specifications for the source device and the target device can be performed, respectively. An alteration of the first workflow can be detected and implemented, in response to the comparative analysis to generate an updated first workflow. Using the AR device, the updated first workflow can be sent to the target device.

20 Claims, 8 Drawing Sheets

(56) References Cited

U.S. PATENT DOCUMENTS

| | | | | |
|---|---|---|---|---|
| 2019/0339058 | A1 | 11/2019 | Dryer | |
| 2019/0354761 | A1* | 11/2019 | Arshad | G06Q 10/06 |
| 2020/0126661 | A1* | 4/2020 | Flexman | G16H 30/40 |
| 2020/0162851 | A1* | 5/2020 | Wilde | G06F 3/011 |
| 2020/0167712 | A1* | 5/2020 | Stracquatanio | G06Q 10/10 |
| 2020/0193708 | A1* | 6/2020 | Maggiore | H04W 4/029 |
| 2021/0134467 | A1* | 5/2021 | Poltaretskyi | G06F 3/0482 |
| 2021/0150438 | A1* | 5/2021 | Mehrotra | G06Q 10/06316 |
| 2021/0271886 | A1* | 9/2021 | Zheng | G06Q 10/0633 |
| 2022/0004954 | A1* | 1/2022 | Rafferty | G06Q 10/06316 |

OTHER PUBLICATIONS

"Primary Device Clipboard Transfer to Execute a Secondary Device Paste with Gaze Based Focus", An IP.com Prior Art Database Technical Disclosure, Disclosed Anonymously, IP.com No. IPCOM000261473D, IP.com Electronic Publication Date: Mar. 7, 2020, 4 pages, <https://priorart.ip.com/IPCOM/000261473>.

Mell, et al., "The NIST Definition of Cloud Computing", National Institute of Standards and Technology, Special Publication 800-145, Sep. 2011, 7 pages.

Poupyrev, et al., "Developing a Generic Augmented-Reality Interface", Computer 35(3), Apr. 2002, pp. 44-50, <https://www.researchgate.net/publication/2955617 >.

International Search Report and Written Opinion for International Application No. PCT/EP2022/064220, International Filing Date: May 25, 2022, Date of Mailing: Sep. 30, 2022, 13 pages.

* cited by examiner

USING AN AUGMENTED REALITY DEVICE TO IMPLEMENT A COMPUTER DRIVEN ACTION BETWEEN MULTIPLE DEVICES

BACKGROUND

The present disclosure relates to computer driven actions between multiple devices using augmented reality, and more specifically, the present disclosure relates to using an augmented reality headset for initiating a computer command to implement an action between multiple devices.

In one example, many devices and machines incorporate, at least in part, workflow instructions for operational functions of the machine or device. In some instances, the machines and their respective workflows can incorporate connectivity to a network, in one expel, accessing data stored remotely. In another example, the machines and devices have connectivity to other devices forming a network of device or things, which can be referred to as an Internet of Things (IoT). In another example, machines or devices can include all or part of the above and incorporate Artificial Intelligence.

In one example, a user may want to duplicate a workflow from one machine to another machine. Currently, there is not a technique for a user to duplicate a workflow on one machine or device to apply the workflow to another machine or device.

SUMMARY

The present disclosure recognizes the shortcomings and problems associated with current techniques for duplicating or copying a workflow for a machine or device to another machine or device.

In one embodiments according to the present invention, an augmented reality-based method and system can be used where a user can copy various actions, for example, a workflow, from one or more machine to augmented reality (AR) glasses or a headset clipboard, and paste the same to another machine from a AR device clipboard for executing the same action or workflow with little or no customization.

Augmented reality systems can enable a user using a user device, such as a headset for a user, to visualize digital content. Such visual content displayed on a headset or glasses or goggles is in front of the user's eyes. In one instance, the content can be projected directly on the retina of the user.

In one example, a copy and paste operation can be effective to copy content from one place to another place or can also be used for copying from one device to another device, thus enabling reuse of content from one device to another device. In one example, devices can be connected or communicating, and the devices can perform various sequences of activities in a workflow. Also, various activities can be performed by involving one or more devices. In one example, a user may want to copy one or more action, for example, including a workflow, from any machine or device and paste the same action to other machines or devices with little or no customization. The present invention includes a method and system by which a user can copy actions from one machine and paste the same to another machine.

In an aspect according to the present invention, a computer-implemented method for initiating a computer command, using an augmented reality (AR) device, for implementing an action between multiple devices. The method includes executing a first computer command, using an augmented reality device, with respect to a source device, and the first computer command includes copying a first workflow of the source device. The method includes initiating a second computer command, using the augmented reality device, to a target device, where the second computer command includes sending the first workflow of the source device to the target device. The method includes performing a comparative analysis of specifications for the source device and the target device, respectively. Further, the method includes detecting and implementing an alteration of the first workflow, in response to the comparative analysis to generate an updated first workflow, and sending, using the AR device, the updated first workflow to the target device.

In a related aspect, the method includes receiving the updated first workflow at the target device.

In a related aspect, the specifications, respectively, can include workflow operations for each of the source device and the target device.

In a related aspect, a user can initiate the first computer command, and the user can initiate the second computer command.

In a related aspect, the method can include generating, using a computer communicating with the AR device, a recommendation for the alteration; and receiving acceptance of the recommendation for the alteration.

In a related aspect, the method can include validating the execution of the first command, using a computer, for a user.

In a related aspect, the method can automatically alter the second computer command based on the comparative analysis.

In a related aspect, the method can further include determining other target devices for receiving the second computer command.

In a related aspect, the method can further include determining other target devices for receiving the second computer command; recommending the other target devices to the user using the AR device; and receiving, from the user, a selection of one of the other target devices using the AR device.

In a related aspect, the method can further include implementing the updated first workflow at the target device.

In related aspect, the first workflow can be accessed from the source device using a first visual cue using the AR device, and the updated first workflow can be sent to the target device using a second visual cue using the AR device.

In a related aspect, the method can further include retrieving the first workflow from a computer readable storage device communicating with the AR device.

In a related aspect, the AR device is an AR headset or AR glasses.

In a related aspect, the method further includes generating a model at least in part incorporating the comparative analysis of the specification; generating the alteration of the first workflow as at least part of the model; assessing the performance of the target device using the updated first workflow in the model; and performing the sending of the updated first workflow to the target device, in response to the model meeting a performance threshold.

In a related aspect, the method further includes iteratively updating the updated first workflow based on the assessing of the performance of the targeted device in the model.

In another aspect, a system using a computer for initiating a computer command, using an augmented reality (AR) device, can be used for implementing an action between multiple devices. The system can include: a computer system comprising; a computer processor, a computer-readable storage medium, and program instructions stored on the computer-readable storage medium being executable by the processor, to cause the computer system to perform the following functions to;

execute a first computer command, using an augmented reality device, with respect to a source device, the first computer command includes copying a first workflow of the source device; initiate a second computer command, using the augmented reality device, to a target device, the second computer command includes sending the first workflow of the source device to the target device; perform a comparative analysis of specifications for the source device and the target device, respectively; detect and implementing an alteration of the first workflow, in response to the comparative analysis to generate an updated first workflow; and send, using the AR device, the updated first workflow to the target device.

In a related aspect, the system includes receiving the updated first workflow at the target device.

In a related aspect, the specifications, respectively, can include workflow operations for each of the source device and the target device.

In a related aspect, a user can initiate the first computer command, and the user initiates the second computer command.

In another aspect, a computer program product for initiating a computer command, using an augmented reality (AR) device, can be used for implementing an action between multiple devices. The computer program product can include a computer readable storage medium having program instructions embodied therewith. The program instructions can be executable by a computer to cause the computer to perform functions, by the computer, comprising the functions to: execute a first computer command, using an augmented reality device, with respect to a source device, the first computer command includes copying a first workflow of the source device; initiate a second computer command, using the augmented reality device, to a target device, the second computer command includes sending the first workflow of the source device to the target device; perform a comparative analysis of specifications for the source device and the target device, respectively; detect and implementing an alteration of the first workflow, in response to the comparative analysis to generate an updated first workflow; and send, using the AR device, the updated first workflow to the target device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Figure 1:
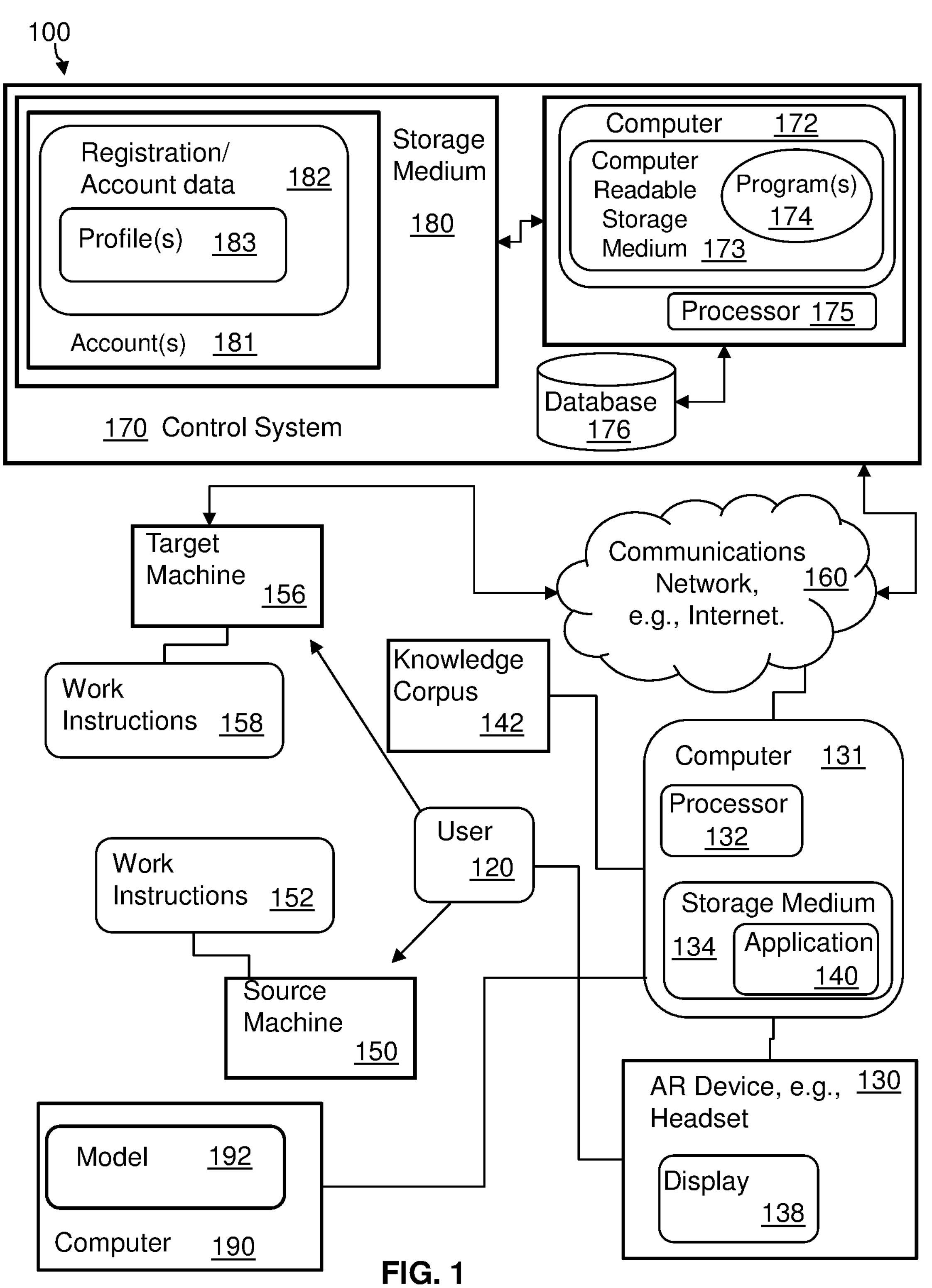
FIG. 1 is a schematic block diagram illustrating an overview of a system, system features or components, and methodology for initiating a computer command, using an augmented reality (AR) device, for implementing an action between multiple devices, according to an embodiment of the present disclosure.
Figure 2:
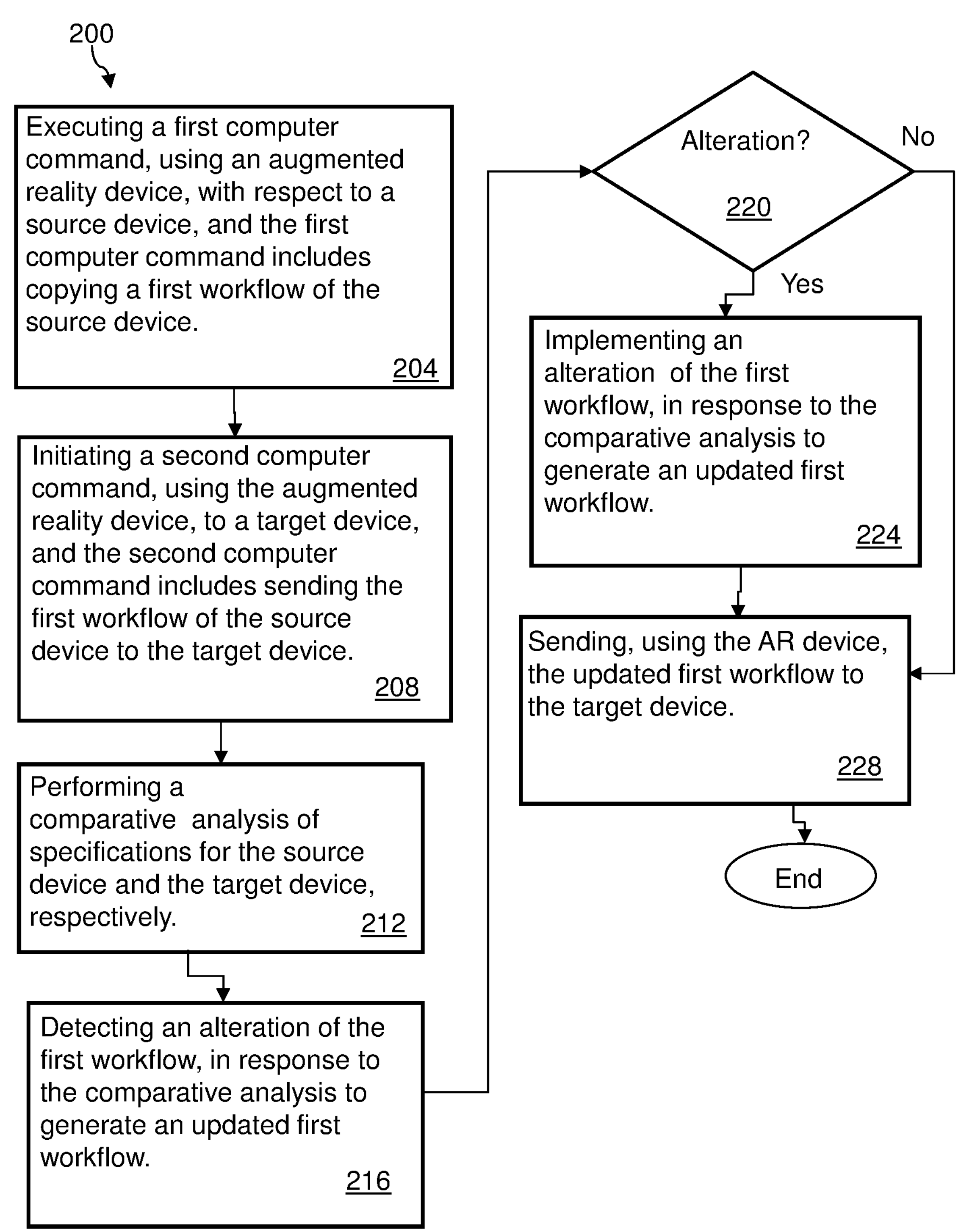
FIG. 2 is a flow chart illustrating a method, implemented using the system shown in FIG. 1, for initiating a computer command, using an augmented reality (AR) device, for implementing an action between multiple devices, according to an embodiment of the present disclosure.
Figure 3:
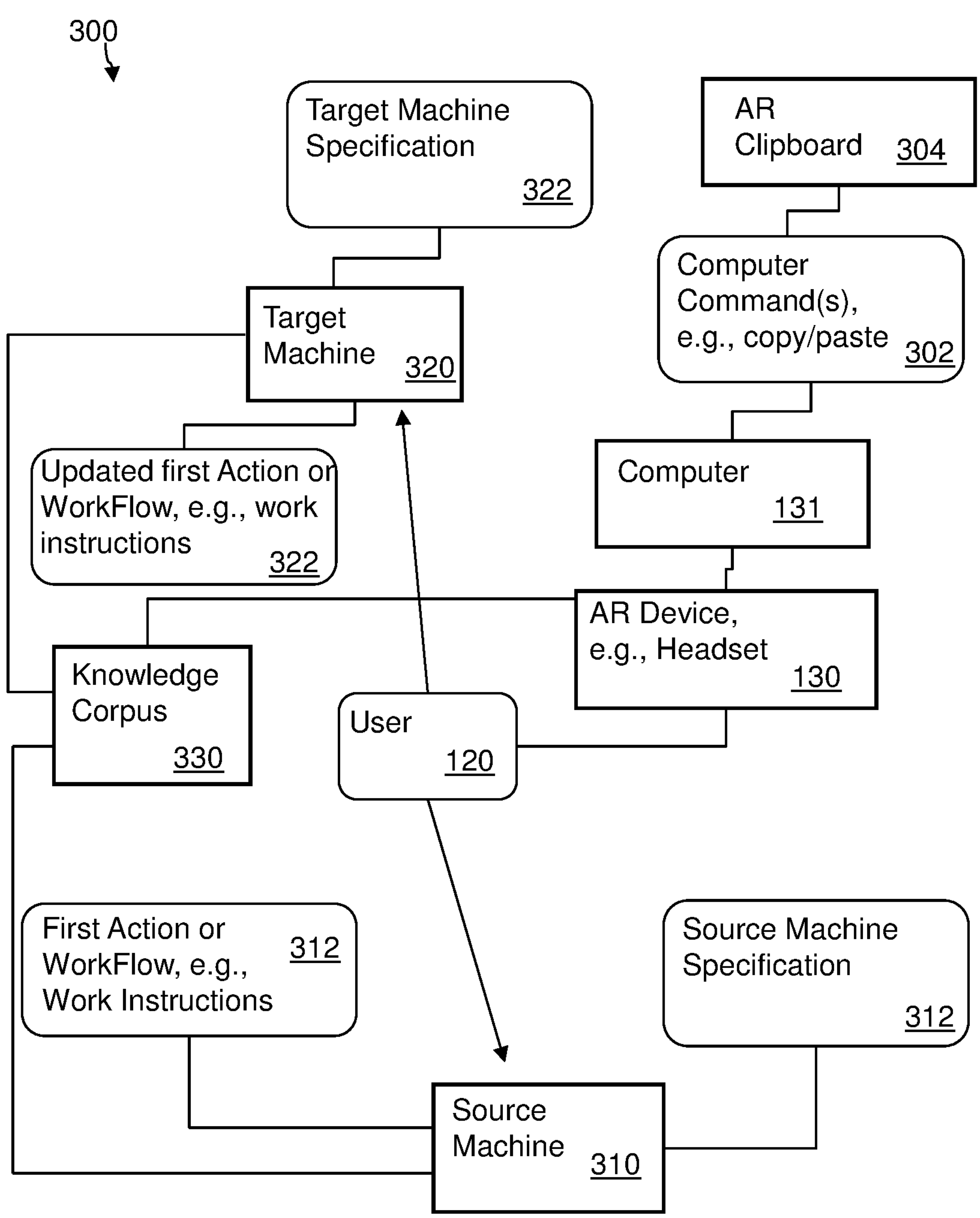
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for initiating a computer command, using an augmented reality (AR) device, for implementing an action between multiple devices.

Referring to FIGS. 1, 2 and 3, a computer-implemented method 200 is used for initiating a computer command, using an augmented reality (AR) device, for implementing an action between multiple devices, according to an embodiment of the present disclosure.

The computer-implemented method 200 includes a-series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes operations for initiating a computer command, using an augmented reality (AR) device, for implementing an action between multiple devices. The method 200 includes executing a first computer command, using an augmented reality device, with respect to a source device, as in block 204. The first computer command includes copying a first workflow of the source device, as in block 204. For example, a first commuter command, such as a copy command, can be initiated by a user using the augmented reality device. In one example, the augmented reality device can be an AR headset. In another example, the augmented reality device can be AR glasses. The initiation by the user can include a visual cue, a selection of one or more options, or a physical action such as a hand gesture or a finger pointing, wherein such physical actions can work in concert with the AR device to implement the action initiated by the user.

The method includes initiating a second computer command, using the augmented reality device, to a target device, as in block 208. The second computer command includes sending the first workflow of the source device to the target device, as in block 208. For example, the user can initiate sending the first workflow to the target device using the AR device and a physical action or selection using the AR device as described above. For example, a selection can be initiated by the user making a selection on an AR device such as a glass interface.

The method includes performing a comparative analysis of specifications for the source device and the target device, respectively, as in block 212.

The method includes detecting an alteration of the first workflow, in response to the comparative analysis to generate an updated first workflow, as in block 216.

When an alteration is detected at block 220, the method can proceed to block 224. When an alteration is not detected at block 220, the method can continue to block 228.

The method includes detecting and implementing an alteration of the first workflow, in response to the comparative analysis to generate an updated first workflow, as in block 216.

The method includes sending, using the AR device, the updated first workflow to the target device, as in block 228.

In one example, the method can include receiving the updated first workflow at the target device.

In another example, the specifications, respectively, include workflow operations for each of the source device and the target device.

In another example, a user can initiate the first computer command, and the user can initiate the second computer command.

In another example, the method can include generating, using a computer communicating with the AR device, a recommendation for the alteration. The method can include receiving acceptance of the recommendation for the alteration. For example, the AR device can project on a screen or glass of a headset one or more recommendations for altering the work instructions. In another example, the user can select one of the alterations recommended. The selection by the user can include a visual cue or hand motion or other action for selection using the AR device.

In another example, the method can include validating the execution of the first command, using a computer, for a user. For example, a validation or validation process can be initiated for the user initiating a copy or a paste command for the action or workflow.

In another example, the method can include automatically alter the second computer command based on the comparative analysis. Such alteration can include adding or removing work instructions of a workflow, or modifying such work instructions of a workflow for adapting the workflow for a different machine or device.

In another example, the method can include determining other target devices for receiving the second computer command. For example, other target devices can include another or other machines or devices.

Figures 4A, 4B:
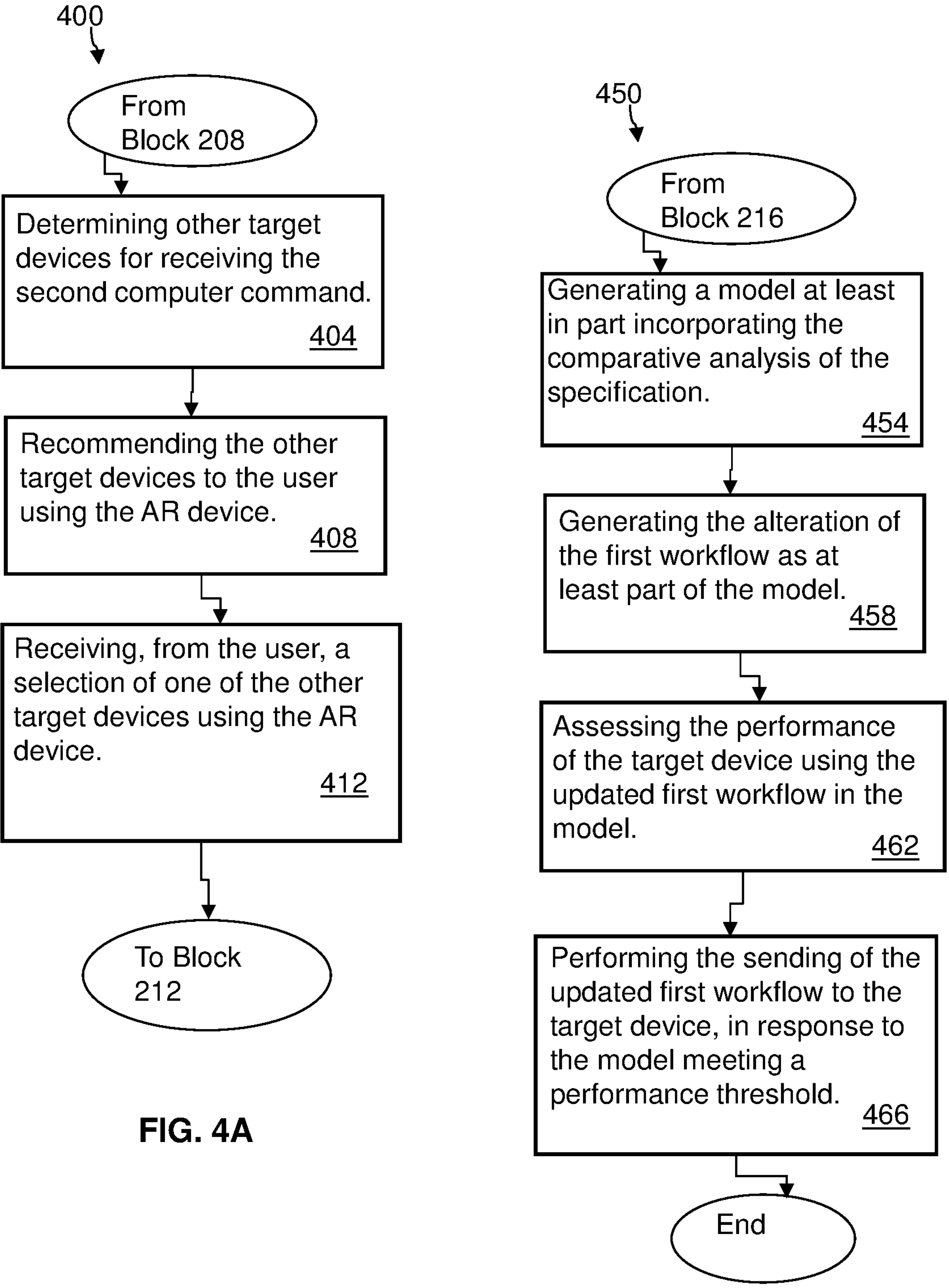
FIG. 4A is a flow chart illustrating another method, which continues from the flow chart of FIG. 2, for initiating a computer command, using an augmented reality (AR) device, for implementing an action between multiple devices.
FIG. 4B is a flow chart illustrating another method, which continues from the flow chart of FIG. 2, for initiating a computer command, using an augmented reality (AR) device, for implementing an action between multiple devices, which generates and uses a computer model.

Referring to FIG. 4A, in another embodiment according to the present disclosure, a method 400 continuing from block 208 of the method 200 shown in FIG. 2. The method 400 includes determining other target devices for receiving the second computer command, as in block 404. The method 400 includes recommending the other target devices to the user using the AR device, as in block 408. The method further includes receiving, from the user, a selection of one of the other target devices using the AR device, as in block 412. The method 400 continues to block 212 of method 200 shown in FIG. 2.

In another example, the method can include implementing the updated first workflow at the target device.

In another example, the first workflow can be accessed from the source device using a first visual cue using the AR device, and the updated first workflow can be sent to the target device using a second visual cue using the AR device.

In another example, the method includes retrieving the first workflow from a computer readable storage device communicating with the AR device.

In another example, the AR device can be an AR headset or AR glasses.

Referring to FIG. 4B, in another embodiment according to the present disclosure, a method 450 continuing from block 216 of the method 200 shown in FIG. 2. The method 450 includes generating a model at least in part incorporating the comparative analysis of the specification, as in block 454. The method 450 includes generating the alteration of the first workflow as at least part of the model, as in block 458. The method 450 further includes assessing the performance of the target device using the updated first workflow in the model, as in block 462. Also, the method 450 includes performing the sending of the updated first workflow to the target device, in response to the model meeting a performance threshold, as in block 466.

In another example, the method includes iteratively updating the updated first workflow based on the assessing of the performance of the targeted device in the model.

Other Embodiments and Examples

Referring to FIG. 1, the device 130, also can be referred to as a user device or an administrator's device, includes a computer 131 having a processor 132 and a storage medium 134 where an application 140, can be stored. The application can embody the features of the method of the present disclosure as instructions. The user can connect to a learning engine 150 using the device 130. The device 130 which includes the computer 131 and a display or monitor 138. The application 140 can embody the method of the present disclosure and can be stored on the computer readable storage medium 134. The device 130 can further include the processor 132 for executing the application/software 140. The device 130 can communicate with a communications network 160, e.g., the Internet.

It is understood that the user device 130 is representative of similar devices which can be for other users, as representative of such devices, which can include, mobile devices, smart devices, laptop computers etc.

In another example and embodiment, profiles can be saved for users/participants. Such profiles can supply data regarding the user and history of deliveries for analysis. When a profile is not found at block 112, the method creates a profile at block 116.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the methods and systems of the present disclosure. Additionally, the functional system 300, according to an embodiment of the present disclosure, depicts functional operation indicative of the embodiments discussed herein.

More Embodiments and Examples

Referring to FIG. 3, in one embodiment according to the present disclosure, a system 300 can be used to initiate a computer command 302, using an augmented reality (AR) device, for example, an AR headset 130, for implementing an action between multiple devices. In one example, a method and system can provide an augmented reality-based technique by which a user can copy various actions from one or more machine to an AR glass clipboard and paste the same to other machine from the AR device clipboard, for executing the same action with little or no customization in the other machine.

Again referring to FIG. 3, wherein similar components have the same reference numerals as the system 100 shown in FIG. 1, a system 300 includes or operates in concert with a computer 131 implemented method for initiating a computer command 302, using an augmented reality (AR) device 130, for implementing an action between multiple devices. The system and method includes executing a first computer command, generically represented as computer command 302, using an augmented reality device 130, with respect to a source device or source machine 310. The first computer command includes copying a first workflow 322 of the source device 310. The system and method includes initiating a second computer command, generically represented as a computer command 302, using the augmented reality device 130, to a target device or machine 320. The second computer command includes sending or pasting the first workflow of the source device 310 to the target device 320. The system and method includes performing a comparative analysis of specifications, for example, source machine specification 312, and target machine specification 322, for the source device and the target device, respectively. The system and method includes detecting and implementing an alteration of the first workflow, in response to the comparative analysis to generate an updated first workflow 322. The system and method includes sending, using the AR device, the updated first workflow to the target device, and the updated first workflow 322 can be received at the target device 320.

Using an augmented reality device, a user can visualize digital content in front of their eyes, and the content can be projected directly on the retina of the user. A copy and paste operation can be effective to copy content from one place to another place or can also be used for copying from one device to another device. This enabling reuse of any content from one device to another device. Devices may be connected for communication, and perform various sequence of activities in a workflow. Various activities can be performed by involving one or more devices.

A user may want to copy one or more actions from any machine and paste the same action to other machine with little or no customization. For example, in operation, a user may have seen automation steps at another's house, and the user wants to copy the automation steps and paste the automation steps in a home or target machine. Thus, the embodiments of the present disclosure enable a user to copy actions from one machine and paste the same to another machine.

In one example, a method and/or system can include a user using augmented reality glasses can copy functionality and/or execution steps of a workflow from one machine to an AR device clipboard, and paste the same to other machine from the AR glass clipboard. Thus, the other machine can execute the same activity in the selected machine.

In one example, when an action is pasted from an AR glass clipboard to a target device, the method and system can perform comparative analysis of specifications between the source machine from where it is copied and the machine where the action will be pasted or target machine. Accordingly, the method and system can recommend a customization and/or an alteration to the action or workflow, if required, before or while (e.g., during the process of pasting) the action or workflow.

In another example, the method and system can validate permission of a user to copy an action from a machine to an AR device clipboard. Thus, based on receiving permission, a user can copy the actions of a machine to an AR clipboard such as an AR glasses clipboard.

When a user has permission to copy an action or a workflow of a machine, the AR device user can be visualizing the actions and workflow associated to any machine while the user is looking at the machine, e.g., the machine is in the user's line of vision. Accordingly, a trigger or action can be initiated by the user, for example, using an eye or hand gesture to copy the action or workflow to an AR system clipboard.

While coping any action or workflow, the AR glass can recommend in which devices the user can paste the copied action or workflow. In one example, an icon of the candidate target machine can be showing in an AR interface.

While pasting an action or a workflow to the target device from the AR clipboard, the method or system can auto-adapt the action sequence based on a target device's specification. In one example, a method and system can automatically create a customized activity map derived from steps of the workflow performed by the user and a knowledge corpus.

In another example, the method and system can include a recommendation engine for the user at later stages to recommend optimum workflow based on previous interactions, current interactions, and crowd sourced interactions and other workflow outcomes.

In one example implementation, according to an embodiment of the present disclosure, in an intelligent ecosystem, devices are connected to a knowledge corpus. For example, the knowledge corpus can be built based on historical learning. Devices can be receiving commands from the knowledge corpus and can execute a set of activities as per an execution rule created from historical learning. Boundary parameters can be received from historical learning, for example, the start condition, end condition, and timing etc. A knowledge corpus can be created based on historical learning. Each and every activity or activity workflow can be associated to one or more devices, and the input information to start a device can be gathered from various other devices etc.

A use can use augmented reality glass or glasses, to visualize what actions are being executing in various devices. In this case an AR system can be connecting with the machine, and can show what activities are being performed with the machine. The system can show what are the triggering points to start or activate an action, and what types of activities are being performed, as well as duration of the activities, etc. The identified information associated to any device can be identified from a knowledge corpus of the autonomous ecosystem, and the same can be shown in the AR glass when the user is looking at the device. The system can be validated when a user has permission to view the activity or workflow being performed by the machine. In one example, an authorized user can provide permission to view the action perform by the machine in AR glass, and also if the user can copy the activity in the AR clipboard. A user's AR glass can also be knowing types of devices the user is having, and will be knowing if the devices are connected, and can also receive the commands from a knowledge corpus. In one example, when a user likes any activity, while any activity is being performed by a machine, then the user can select the activity or a set of activities and copy activity or the set of activities in the AR glass clipboard. Based on the copy activity with the AR glass, the proposed system can copy the activity functionality or activity script from the knowledge corpus for the specified device where the user is looking at, for example, the copying functionality is activated by the user gazing, using the AR glass, at a selected machine.

The content is copied and stored in the clipboard of the AR glass, in this case, while copying, the system can identify the functionality, workflow, and boundary condition. The functionality includes activities performed by different machines, workflow sequence and how different devices are involved, and a boundary condition, including triggering a rule to start an activity.

In one example, the copied content can be stored in an AR glass clipboard. In another example, a user can copy multiple contents in the AR clipboard. In one example, the AR device can identify which devices the user is selecting, and the specifications for the devices, respectively. Thus, the system can identify which activities or functionalities can be executed by the user's devices. The system can allow the user to alter the copied content and change the boundary conditions. The user can paste the copied content to an appropriate machine, and accordingly the machine can receive the pasted information. Based on the specification of the target machine where the action is pasted, the system can adjust the actions as per the specification of the target machine. Once the activities are pasted in the target devices, the knowledge corpus of the user can receive the pasted activities, and the knowledge corpus can be updated with the pasted activities/information.

In another embodiment according to the present disclosure, a method includes a user using augmented reality glass to copy functionality and/or execution steps of any workflow from a machine to an AR device clipboard, and pasting the same to other machine from the AR glass clipboard to execute the same activity in the selected machine. The method can include an operation while pasting an action from an AR glass clipboard to any target device, the method and a system can perform comparative analysis of specifications between the source machine from where the action is copied and the machine where the action will be pasted, and accordingly recommend any type of customization and alteration which is required in the action while pasting to the target device.

The method can include a step where the system can validate proper permission of the user to copy any action from any machine to an AR device clipboard, based on the permission, the user can copy the actions of any machine to AR glass clipboard. The method can further include where a user has permission to copy an action or a workflow of any machine, then the AR glass user can visualize the actions and workflow associated to any machine while the user is looking at the machine, and accordingly with eye or hand gesture, the user can copy the action or workflow in the AR system clipboard. The method can include while coping any action or workflow, the AR glass can be recommending in which devices the user can paste the copied action or workflow, and an icon of the candidate target machine can be shown in an AR interface. Further, the method can include while pasting any action or a workflow to a target device from an AR clipboard, the system will auto adapt the action sequence based on the target devices specification. Still further, the method can include auto creating a customized activity map derived from workflow operations performed by the user and the knowledge corpus. The method and system can include a recommendation engine for the user at later stages to recommend optimum workflow based on previous interactions, current interactions, and crowd sourced interactions, and another workflow outcome can be generated from creating a customized activity map.

Embodiments of the present disclosure provide a comprehensive and well-rounded solution using AR where a user wants to copy one or more actions from any machine and paste the same action to other machine with little or no customization. And, also described is a method where using augmented reality glass a user can copy functionality and/or execution steps of any workflow from one or machine to AR device clipboard and paste the same to other machine from the AR glass clipboard to execute the same activity in the selected machine. Embodiments of the present disclosure can include while pasting any action from an AR glass clipboard to any target device, the system can perform comparative analysis of specifications between the source machine from where it is copied and the machine where the action will be pasted, and accordingly the system can recommend what types of customization and alteration is required in the action while pasting to a target device. Further, embodiments can include where when a user has permission to copy an action or a workflow of any machine, then the user, using AR glass can visualize the actions and workflow associated to any machine while the user is looking at the machine, and accordingly with eye or hand gesture a user can copy the action or workflow in the AR system clipboard. Further, embodiments can include an operation that while copying any action or workflow, the AR glass can recommend in which devices the user can paste the copied action or workflow, and an icon of the candidate target machine can be showing in an AR interface. In another example, a method and system can auto adapt while pasting any action or a workflow to a target device from an AR clipboard to meet the target device specifications. Also, a method and system can auto create a customized activity map derived from steps of the workflow performed by the user and the knowledge corpus. Also, a method and system can include a recommendation engine for the user at later stages to recommend optimum workflow based on previous interactions, current interactions, and crowd sourced interactions, to generate another workflow outcome.

More Examples and Embodiments

Operational blocks and system components shown in one or more of the figures may be similar to operational blocks and system components in other figures. The diversity of operational blocks and system components depicting example embodiments and aspects according to the present disclosure. For example, the method shown in FIG. 4 is intended as another example embodiment which can include aspects/operations shown and discussed previously in the present disclosure, in one example, continuing from a previous method shown in associated flow chart.

Additional Examples and Embodiments

Figure 5:
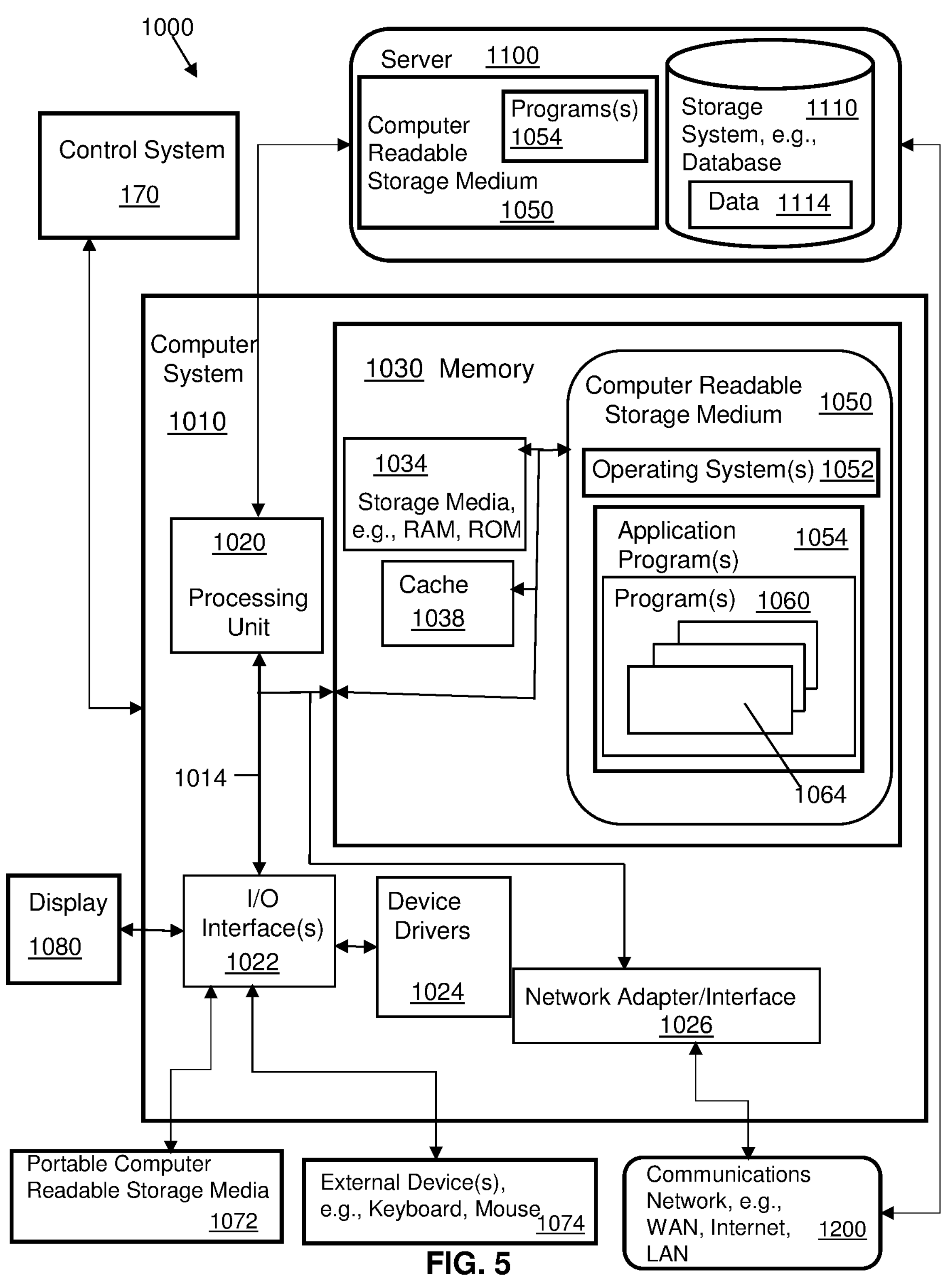
FIG. 5 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 5). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 140, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 140 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 5 and described in more detail in regards thereto referring to one or more computer systems 1010.

Thus, in one example, a control system 170 is in communication with the computer 131 or device 130, and the computer can include the application or software 140. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 140, which can include program instructions executable using a processor 132. These features are shown herein in FIG. 1, and also in an embodiment of a computer system shown in FIG. 5 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 140. In one example, the application 140 is stored on a device, for example, a computer or device on location 130, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 140. The application 140 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model for monitoring and enhancing performance of containers using a calibration technique.

In another example, the control system 170 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 5, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system.

Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 6:
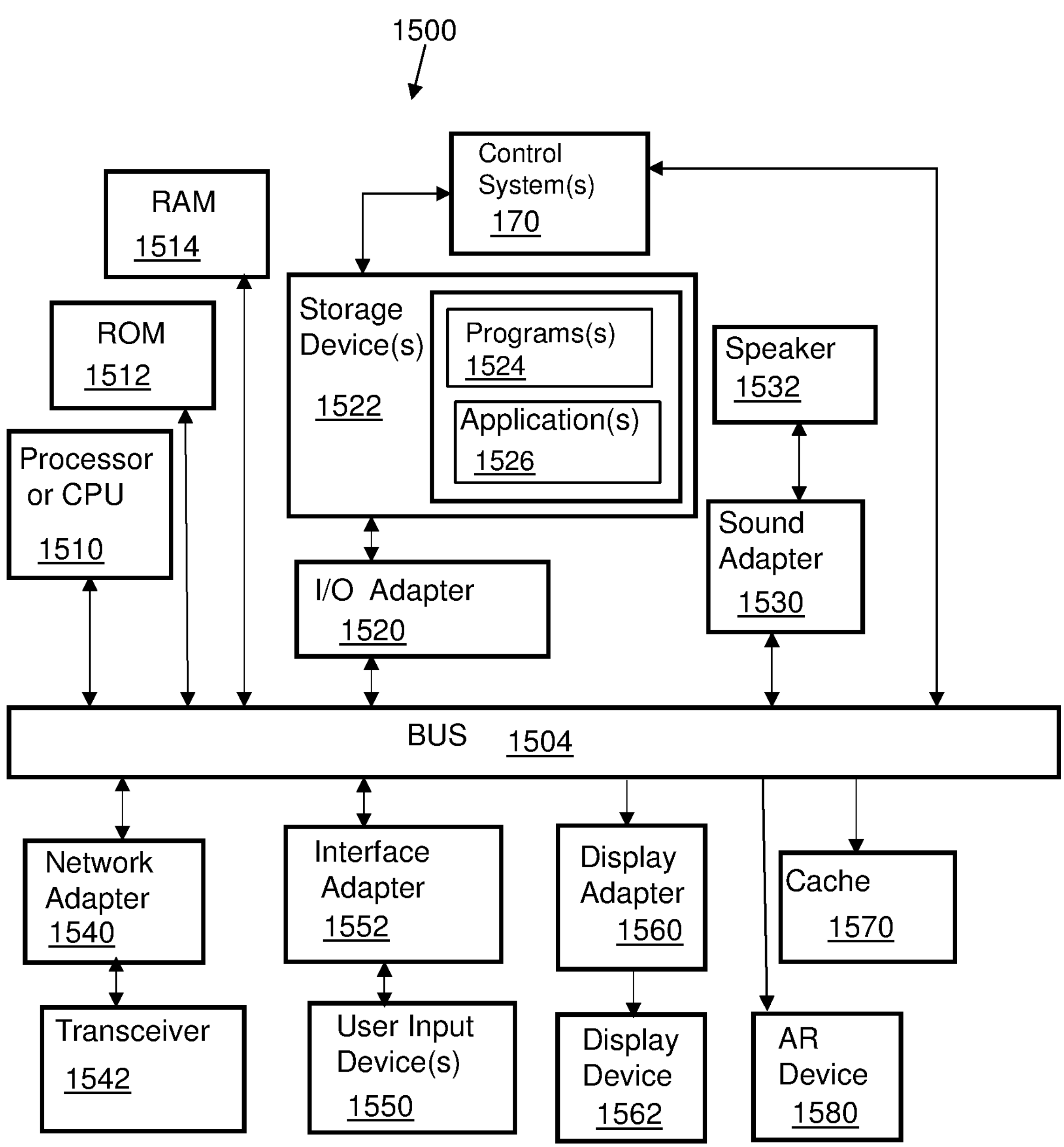
FIG. 6 is a schematic block diagram of a system depicting system components interconnected using a bus. The components for use, in all or in part, with the embodiments of the present disclosure, in accordance with one or more embodiments of the present disclosure.

Referring to FIG. 6, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. An AR device 1580 can also be operatively coupled to the bus 1504.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which communicates with the system bus, and thus can communicate with the other components of the system via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
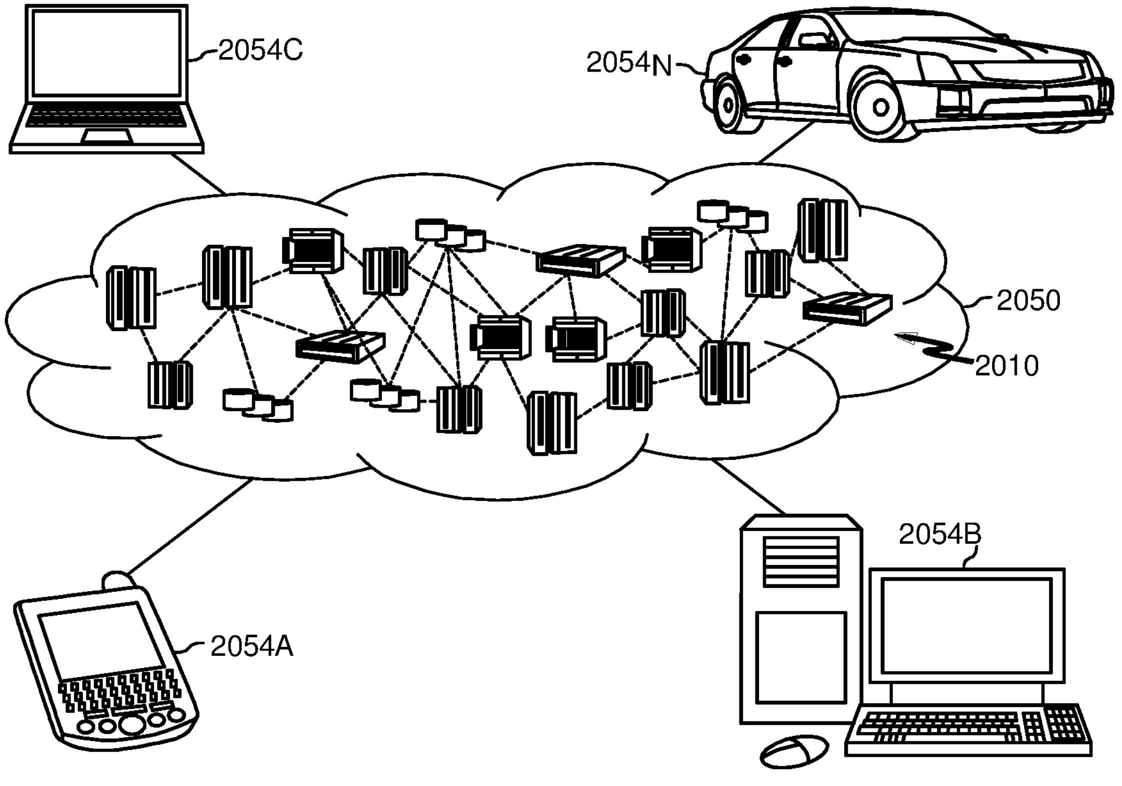
FIG. 7 is a block diagram depicting a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 7 are intended to be illustrative only and that computing nodes 2010 and cloud computing environment 2050 can communicate with any type of computerized device over any type of network and/or network addressable connection (e.g., using a web browser).

Figure 8:
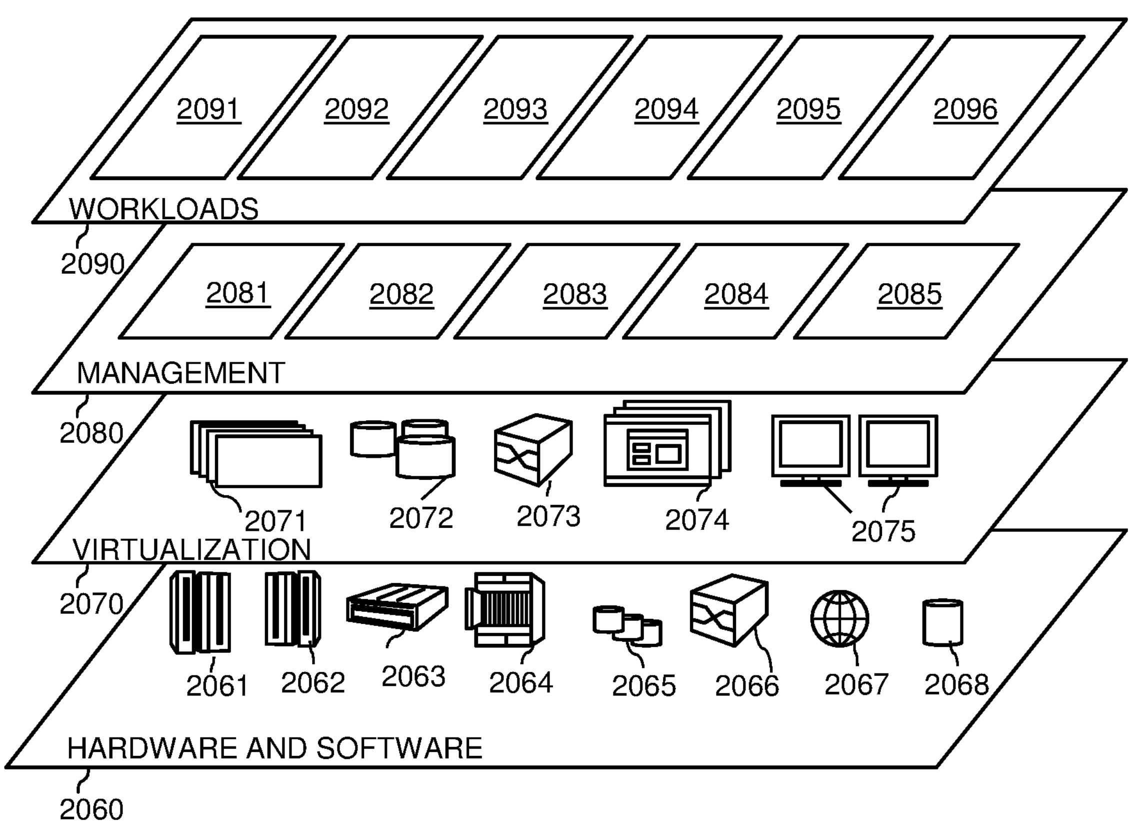
FIG. 8 is a block diagram depicting abstraction model layers according to an embodiment of the present invention.

Referring now to FIG. 8, a set of functional abstraction layers provided by cloud computing environment 2050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and implementing an computer command action between multiple devices 2096, for example, using an augmented reality (AR) device.

What is claimed is:

1. A computer-implemented method for initiating a computer command, using an augmented reality (AR) device, for implementing an action between multiple devices, comprising:

executing a first computer command, using an augmented reality (AR) device, with respect to a source device, the first computer command includes copying a first workflow of the source device, the first workflow including execution steps for performance by the source device;

initiating a second computer command, using the augmented reality device, to a target device, the second computer command includes sending the first workflow of the source device to the target device for performing the execution steps of the first workflow by the target device;

performing a comparative analysis of specifications for the source device and the target device, respectively;

generating a customized activity map derived from workflow operations performed by a user and a knowledge corpus, to generate another workflow outcome;

recommending an alteration of the first workflow, in response to the comparative analysis, to generate an updated first workflow, the alteration including modifying work instructions of the first workflow to adapt to a second workflow for the target device, and the modifying of the work instructions adapts the first workflow for the target device;

the AR device projecting on a screen or glass of a headset the updated first workflow as a recommendation for altering the first workflow, and the AR device receiving a selection by the user of the updated first workflow; and sending, using the AR device, the updated first workflow to the target device for performing modified execution steps which incorporate the modified work instructions; and executing the modified execution steps by the target device.

2. The method of claim 1, further comprising:

receiving the updated first workflow at the target device.

3. The method of claim 1, wherein the specifications, respectively, include workflow operations for each of the source device and the target device.

4. The method of claim 1, wherein the user initiates the first computer command, and the user initiates the second computer command.

5. The method of claim 1, further comprising:

generating, using the computer communicating with the AR device, the recommendation for the alteration; and receiving acceptance of the recommendation for the alteration.

6. The method of claim 1, further comprising:

validating the execution of the first command, using the computer, for the user.

7. The method of claim 1, automatically altering the second computer command based on the comparative analysis.

8. The method of claim 1, further comprising:

determining other target devices for receiving the second computer command.

9. The method of claim 1, further comprising:

determining other target devices for receiving the second computer command;

recommending the other target devices to the user using the AR device; and receiving, from the user, a selection of one of the other target devices using the AR device.

10. The method of claim 1, further comprising:

implementing the updated first workflow at the target device.

11. The method of claim 1, wherein the first workflow is accessed from the source device using a first visual cue using the AR device, and the updated first workflow is sent to the target device using a second visual cue using the AR device.

12. The method of claim 1, further comprising:

retrieving the first workflow from a computer readable storage device communicating with the AR device.

13. The method of claim 1, wherein the AR device is an AR headset or AR glasses.

14. The method of claim 1, further comprising:

generating a model at least in part incorporating the comparative analysis of the specification;

generating the alteration of the first workflow as at least part of the model;

assessing the performance of the target device using the updated first workflow in the model; and performing the sending of the updated first workflow to the target device, in response to the model meeting a performance threshold.

15. The method of claim 14, further comprising:

iteratively updating the updated first workflow based on the assessing of the performance of the targeted device in the model.

16. A system using a computer for initiating a computer command, using an augmented reality (AR) device, for implementing an action between multiple devices, which comprises:

a computer system comprising: a computer processor, a computer-readable storage medium, and program instructions stored on the computer-readable storage medium being executable by the processor, to cause the computer system to perform the following functions to;

execute a first computer command, using an augmented reality device, with respect to a source device, the first computer command includes copying a first workflow of the source device, the first workflow including execution steps for performance by the source device;

initiate a second computer command, using the augmented reality device, to a target device, the second computer command includes sending the first workflow of the source device to the target device for performing the execution steps of the first workflow by the target device;

perform a comparative analysis of specifications for the source device and the target device, respectively;

generate a customized activity map derived from workflow operations performed by a user and a knowledge corpus, to generate another workflow outcome;

recommend an alteration of the first workflow, in response to the comparative analysis, to generate an updated first workflow, the alteration including modifying work instructions of the first workflow to adapt to a second workflow for the target device, and the modifying of the work instructions adapts the first workflow for the target device;

project, using the AR device, on a screen or glass of a headset the updated first workflow as a recommendation for altering the first workflow, and receive, using the AR device, a selection by the user of the updated first workflow; and send, using the AR device, the updated first workflow to the target device for performing modified execution steps which incorporates the modified work instructions; and executing the modified execution steps by the target device.

17. The system of claim 16, further comprising:

receiving the updated first workflow at the target device.

18. The system of claim 16, wherein the specifications, respectively, include workflow operations for each of the source device and the target device.

19. The system of claim 16, wherein the user initiates the first computer command, and the user initiates the second computer command.

20. A computer program product for initiating a computer command, using an augmented reality (AR) device, for implementing an action between multiple devices, the computer program product comprising a computer readable storage medium having program instructions embodied therewith, the program instructions executable by a computer to cause the computer to perform functions, by the computer, comprising the functions to:

execute a first computer command, using an augmented reality device, with respect to a source device, the first computer command includes copying a first workflow of the source device, the first workflow including execution steps for performance by the source device;

initiate a second computer command, using the augmented reality device, to a target device, the second computer command includes sending the first workflow of the source device to the target device for performing the execution steps of the first workflow by the target device;

perform a comparative analysis of specifications for the source device and the target device, respectively;

generate a customized activity map derived from workflow operations performed by a user and a knowledge corpus, to generate another workflow outcome;

recommending an alteration of the first workflow, in response to the comparative analysis, to generate an updated first workflow, the alteration including modifying work instructions of the first workflow to adapt to a second workflow for the target device, and the modifying of the work instructions adapts the first workflow for the target device;

project, using the AR device, on a screen or glass of a headset the updated first workflow as a recommendation for altering the first workflow, and receive, using the AR device, a selection by the user of the updated first workflow; and send, using the AR device, the updated first workflow to the target device for performing modified execution steps which incorporate the modified work instructions; and executing the modified execution steps by the target device.

* * * * *